(12) United States Patent
Li

(10) Patent No.: US 9,184,862 B2
(45) Date of Patent: Nov. 10, 2015

(54) METHOD, APPARATUS AND SYSTEM FOR TRANSMITTING SDH/SONET SECTION OVERHEAD BYTES

(71) Applicant: Huawei Technologies Co., Ltd., Shenzhen (CN)

(72) Inventor: Chunrong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 13/656,312

(22) Filed: Oct. 19, 2012

(65) Prior Publication Data

US 2013/0039659 A1 Feb. 14, 2013

Related U.S. Application Data

(63) Continuation of application No. PCT/CN2011/070344, filed on Jan. 18, 2011.

(30) Foreign Application Priority Data

Apr. 21, 2010 (CN) .......................... 2010 1 0156263

(51) Int. Cl.
*H04J 3/12* (2006.01)

(52) U.S. Cl.
CPC ........... *H04J 3/12* (2013.01); *H04J 2203/0082* (2013.01); *H04J 2203/0089* (2013.01)

(58) Field of Classification Search
CPC ....... H04L 12/56; H04L 49/309; H04L 45/74; H04J 3/12; H04J 2203/0089; H04J 2203/0082
USPC .......................................... 370/349, 389, 392
See application file for complete search history.

(56) References Cited

U.S. PATENT DOCUMENTS

| 6,400,996 B1 | 6/2002 | Hoffberg et al. |
| 6,418,424 B1 | 7/2002 | Hoffberg et al. |

(Continued)

FOREIGN PATENT DOCUMENTS

| CN | 1757210 A | 4/2006 |
| CN | 1921445 A | 2/2007 |

(Continued)

OTHER PUBLICATIONS

ITU—Telecommunication Standardization Sector, "Network Node Interface for the Synchronous Digital Hierarchy (SDH)" Erratum 1, Covering Note. Geneva, Sep. 6, 2012.

(Continued)

*Primary Examiner* — Paul H Masur
*Assistant Examiner* — Kabir Jahangir
(74) *Attorney, Agent, or Firm* — Brinks Gilson & Lione

(57) ABSTRACT

The present invention relates to the field of communications technologies and discloses a method, an apparatus and a system for transmitting SDH/Sonet section overhead bytes, which reduce a burden of an intermediate node of a PTN network in a process of transmitting DCC bytes in the PTN network. In the present invention, a pseudo wire is established between a local end node and a peer end node. The local end node separates target overhead bytes from section overhead bytes of an SDH/Sonet frame, where the target overhead bytes include DCC bytes; packages the target overhead bytes to obtain a dedicated overhead packet; and sends the dedicated overhead packet to the peer end node, where the dedicated overhead packet is transmitted as a service packet of the pseudo wire. The embodiments of the present invention are mainly applied to a process of transmitting an SDH/Sonet service in the PTN network.

19 Claims, 6 Drawing Sheets

(56) References Cited

U.S. PATENT DOCUMENTS

| | | | |
|---|---|---|---|
| 6,831,932 B1 | 12/2004 | Boyle et al. | |
| 7,242,988 B1 | 7/2007 | Hoffberg et al. | |
| 2004/0170173 A1* | 9/2004 | Pan et al. | 370/392 |
| 2007/0171860 A1* | 7/2007 | Li et al. | 370/329 |
| 2008/0107416 A1* | 5/2008 | Wang | 398/59 |
| 2009/0175278 A1* | 7/2009 | Harel et al. | 370/395.1 |

FOREIGN PATENT DOCUMENTS

| | | |
|---|---|---|
| CN | 101119164 A | 2/2008 |
| CN | 101179556 A | 5/2008 |
| CN | 101848147 A | 9/2010 |
| WO | WO 02/07356 A2 | 1/2002 |
| WO | WO 2004/066120 A2 | 8/2004 |
| WO | WO 2007/101140 A2 | 9/2007 |

OTHER PUBLICATIONS

ITU—Telecommunication Standardization Sector, "Network Node Interface for the Synchronous Digital Hierarchy (SDH)" G.707, Corrigendum 1, Mar. 2001.

International Telecommunication Union, "Virtual concatenation CRC bits allocation enhancement and sequence numbering" G.707/Y.1322, Corrigendum 3, Mar. 2003.

ITU—Telecommunication Standardization Sector, "Network Node Interface for the Synchronous Digital Hierarchy (SDH)" G.707/Y.1322, Amendment 1, Nov. 2001.

ITU—Telecommunication Standardization Sector, "Network Node Interface for the Synchronous Digital Hierarchy (SDH)" G707/Y.1322, Corrigendum 2, Nov. 2001.

ITU—Telecommunication Standardization Sector, "Network Node Interface for the Synchronous Digital Hierarchy (SDH)" G707/Y.1322, Amendment 2, Aug. 2002.

ITU—Telecommunication Standardization Sector, "Network Node Interface for the Synchronous Digital Hierarchy (SDH)" G707/Y.1322, Amendment 3, Apr. 2003.

ITU—Telecommunication Standardization Sector, "Network Node Interface for the Synchronous Digital Hierarchy (SDH)" G707/Y.1322, Oct. 2000.

Extended European Search Report issued in corresponding European Patent Application No. 11771496.4, mailed Mar. 22, 2013.

Lau et al., "Layer Two Tunneling Protocol (Version 3) L2TPv3" Network Working Group, Mar. 2002.

Written Opinion of the International Searching Authority issued in corresponding PCT Patent Application No. PCT/CN2011/070344, mailed May 26, 2011.

International Search Report issued in corresponding PCT Patent Application No. PCT/CN2011/070344, mailed May 26, 2011.

Riegel, "Requirements for Edge-to-Edge Emulation of Time Division Multiplexed (TDM) Circuits over Packet Switching Networks" Network Working Group, Oct. 2005.

Malis et al., "Synchronous Optical Network/Synchronous Digital Hierarchy (Sonet/SDH) Circuit Emulation over Packet (CEP)" Network Working Group, Apr. 2007.

Cisco Systems, "Understanding MPLS-TP and Its Benefits" Cisco Public Information, 2009.

\* cited by examiner

METHOD, APPARATUS AND SYSTEM FOR TRANSMITTING SDH/SONET SECTION OVERHEAD BYTES

CROSS-REFERENCE TO RELATED APPLICATIONS

This application is a continuation of International Application No. PCT/CN2011/070344, filed on Jan. 18, 2011, which claims priority to Chinese Patent Application No. 201010156263.3, filed on Apr. 21, 2010, both of which are hereby incorporated by reference in their entireties.

FIELD OF THE INVENTION

The present invention relates to the field of communications technologies, and in particular, to a method, an apparatus and a system for transmitting SDH/Sonet section overhead bytes.

BACKGROUND OF THE INVENTION

At present, during a process of replacing an SDH (synchronous digital hierarchy) network with a PTN (packet transport network) network, the PTN network generally needs to be compatible with services, a networking manner and a maintenance mode of the SDH network, so as to implement interworking with the current SDH network, and manage and maintain the SDH network.

The SDH network uses an STM-N frame structure to transmit signals, and the frame structure includes an SOH (section overhead), a management unit pointer and an information payload, where, the SOH includes an RSOH (regenerator section overhead) and an MSOH (multiplex section overhead). In all SOH bytes of the SDH/Sonet, bytes from D1 to D12 are management bytes of the SDH, which are also referred to as DCC (data communications channel) bytes. For ease of managing the SDH network by the PTN network, it is required to transparently transmit the DCC bytes of SDH at two ends of the PTN network in the PTN network.

In the prior art, the DCC bytes are transmitted by using a management packet of a pseudo wire. A Channel Type is set to a specific value in the management packet of the pseudo wire to indicate that the management packet carries the DCC bytes, and meanwhile, the DCC bytes that need to be transparently transmitted are placed into an OAM Packet field for transmitting.

However, the inventor finds that, when the DCC bytes of the SOH are placed into the management packet of the pseudo wire by using the existing method and management information of a service emulated by the pseudo wire is transmitted by using the management packet of the pseudo wire, although the transparent transmission of the DCC bytes may be realized, an intermediate node in the PTN network needs to identify whether the management packet carries the management information of the pseudo wire or the management information of a SDH service, thereby increasing a burden of the intermediate node in the PTN network.

SUMMARY OF THE INVENTION

The present disclosure provide a method, an apparatus and a system for transmitting SDH/Sonet section overhead bytes, which reduces a burden of an intermediate node in a PTN network during a process of transmitting DCC bytes in the PTN network.

In order to achieve the preceding objectives, the aspects of the present disclosure adopt the following technical solutions:

According to an aspect of the present disclosure, a method for transmitting SDH/Sonet section overhead bytes is provided, where a pseudo wire is established between a local end node and a peer end node, and the method includes:
  separating, by the local end node, target overhead bytes from section overhead bytes of an SDH/Sonet frame, where the target overhead bytes include DCC bytes;
  packaging the target overhead bytes to obtain a dedicated overhead packet; and
  sending the dedicated overhead packet to the peer end node through the pseudo wire, where the dedicated overhead packet is transmitted as a service packet of the pseudo wire.

According to another aspect of the present disclosure, a method for transmitting SDH/Sonet section overhead bytes includes:
  receiving a dedicated overhead packet that is sent through a pseudo wire by
  a peer end node, where the dedicated overhead packet is transmitted as a service packet of the pseudo wire; and
  extracting target overhead bytes from the dedicated overhead packet, where the target overhead bytes include DCC bytes.

According to another aspect of the present disclosure, a communication apparatus includes:
  a separation unit, configured to separate target overhead bytes from section overhead bytes of an SDH/Sonet frame, where the target overhead bytes include DCC bytes;
  a packaging unit, configured to package the target overhead bytes to obtain a dedicated overhead packet; and
  a sending unit, configured to send the dedicated overhead packet to a peer end node through a pseudo wire between the communication apparatus and the peer end node, where the dedicated overhead packet is transmitted as a service packet of the pseudo wire.

According to another aspect of the present disclosure, a communication apparatus includes:
  a receiving unit, configured to receive a dedicated overhead packet that is sent through a pseudo wire by a peer end node, where the dedicated overhead packet is transmitted as a service packet of the pseudo wire; and
  an extraction unit, configured to extract target overhead bytes from the dedicated overhead packet, where the target overhead bytes include DCC bytes.

According to another aspect of the present disclosure, a system for transmitting SDH/Sonet section overhead bytes includes:
  a local end node, configured to separate target overhead bytes from section overhead bytes of an SDH/Sonet frame, where the target overhead bytes include DCC bytes; package the target overhead bytes to obtain a dedicated overhead packet; and send the dedicated overhead packet to a peer end node through a pseudo wire, where the dedicated overhead packet is transmitted as a service packet of the pseudo wire; and
  the peer end node, configured to receive the dedicated overhead packet that is sent through the pseudo wire by the local end node, where the dedicated overhead packet is transmitted as the service packet of the pseudo wire; and extract the target overhead bytes from the dedicated overhead packet, where the target overhead bytes include the DCC bytes.

In the aspects of the present disclosure described in the preceding technical solutions, during a process of replacing an SDH/Sonet network with a PTN network, when an SDH/Sonet signal needs to be transmitted through the PTN network, a pseudo wire is established between two ends that perform communication in the PTN network. At one end that performs communication, the target overhead bytes are first separated from the section overhead bytes of the SDH/Sonet frame that needs to be transmitted, where the separated target overhead bytes are a part of all section overhead bytes in the SDH/Sonet frame and the target overhead bytes include the DCC bytes. Then, the target overhead bytes are packaged to obtain the dedicated overhead packet, and the dedicated overhead packet is sent to the peer end node through the pseudo wire, where the dedicated overhead packet is transmitted as the service packet of the pseudo wire.

In the other end that performs communication, the dedicated overhead packet sent by a peer end node through the pseudo wire is received, where the dedicated overhead packet is transmitted as the service packet of the pseudo wire. Afterwards, the target overhead bytes are extracted from the dedicated overhead packet, where the target overhead bytes include the DCC bytes, thereby realizing transparent transmission of the DCC bytes.

Since the DCC bytes are packaged into the dedicated overhead packet, and the dedicated overhead packet carrying the DCC bytes is transmitted as the service packet of the pseudo wire, compared with the prior art in which a management packet of the pseudo wire is used to transmit the DCC bytes, the intermediate node in the PTN network does not need to perceive whether the packet transmitted in the pseudo wire carries a payload or a section overhead, thereby reducing the burden of the intermediate node in the PTN network and realizing real transparent transmission of the DCC bytes.

BRIEF DESCRIPTION OF THE DRAWINGS

To make the technical solutions of the present invention or the prior art clearer, the accompanying drawings for illustrating the embodiments of the present invention or the prior art are briefly described below. Apparently, the accompanying drawings illustrate only some embodiments of the present invention, and persons having ordinary skill in the art can derive other accompanying drawings from these accompanying drawings without any creative effort.

DETAILED DESCRIPTION OF THE EMBODIMENTS

Figure 1:
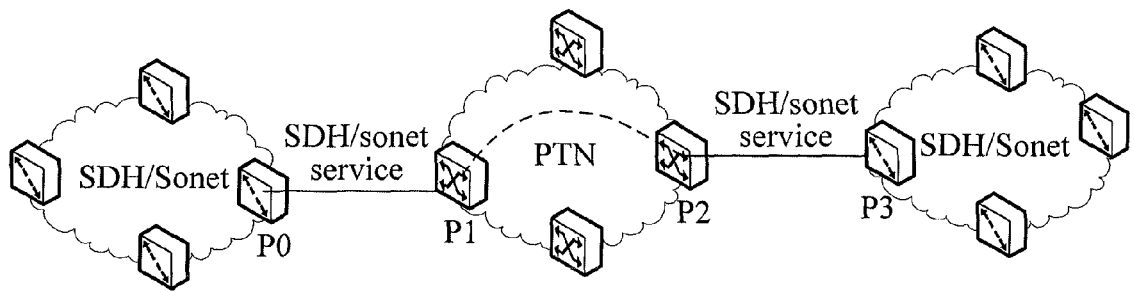
FIG. 1 is a schematic diagram of a process of transparent transmission of an SDH/Sonet service in a PTN network.

In a scenario in which a PTN network is connected to different SDH/Sonet networks, when a signal in one SDH/Sonet network needs to be transmitted to another SDH/Sonet network through the PTN network, as shown in FIG. 1, a node P1 in the PTN network first receives an SDH/Sonet signal that is sent through a node P0 by the SDH/Sonet network, for ease of managing the SDH network, the node P1 needs to fully transmit DCC bytes in the signal to a node P2, and then the node P2 in the PTN network transmits the DCC bytes to a receiving node P3 in the another SDH/Sonet network. A method, an apparatus and a system for transmitting SDH/Sonet section overhead bytes according to embodiments of the present invention are clearly and completely illustrated with reference to the accompanying drawings in the embodiments of the present invention.

Embodiment 1

Figure 2:
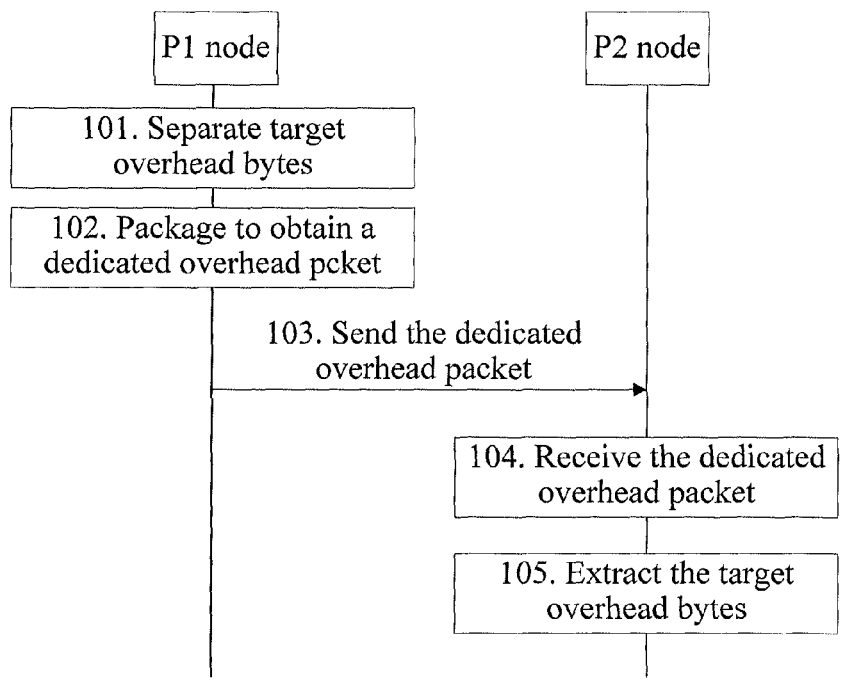
FIG. 2 is a flow chart of a method for transmitting SDH/Sonet section overhead bytes according to Embodiment 1 of the present invention.

An embodiment of the present invention provides a method for transmitting SDH/Sonet section overhead bytes, and as shown in FIG. 2, the method includes the following:

101. After receiving the SDH/Sonet signal, the node P1 in the PTN network first separates target overhead bytes from section overhead bytes of an SDH/Sonet frame, where the target overhead bytes include DCC bytes. The target overhead bytes are a part of all section overhead bytes in the SDH/Sonet frame. The target overhead bytes include all DCC bytes, and these DCC bytes are management bytes in the SDH/Sonet frame.

102. Then, P1 packages the target overhead bytes to obtain a dedicated overhead packet, where the dedicated overhead packet is used to transmitting the target overhead bytes and is transmitted separately from another packet, for example, a packet carrying a payload, during the packet transmission.

103. After the target overhead bytes are packaged into the dedicated overhead packet, send the dedicated overhead packet to a peer end node through a pseudo wire that is established between P1 and the peer end node, where the dedicated overhead packet is transmitted as a service packet of the pseudo wire. For example, the node P1 in the PTN network in FIG. 1 transmits the dedicated overhead packet to the peer end node P2 of P1 through the pseudo wire.

104. After the dedicated overhead packet is transmitted to the peer end node, that is, the node P2 in FIG. 1, the node P2 first receives the dedicated overhead packet that is sent through the pseudo wire by the node P1, where the dedicated overhead packet is transmitted as a service packet of the pseudo wire.

105. Then, the node P2 extracts the target overhead bytes from the dedicated overhead packet, where the target overhead bytes include DCC bytes, thereby obtaining the DCC bytes.

The DCC bytes are packaged into the dedicated overhead packet at the local end of communication, and then the dedicated overhead packet is transmitted through the pseudo wire that is established between the two ends of communication.

At the peer end of communication, the dedicated overhead packet is unpackaged and the target overhead bytes are extracted, and then the DCC bytes are obtained, thereby implementing the transmission of the DCC. In the process of transmitting the dedicated overhead packet, since the dedicated overhead packet is used as the service packet of the pseudo wire, an intermediate node in the PTN network does not need to perceive whether the packet transmitted in the pseudo wire carries a payload or a section overhead, thereby reducing a burden of the intermediate node in the PTN network and realizing real transparent transmission of the DCC bytes.

Figure 3:
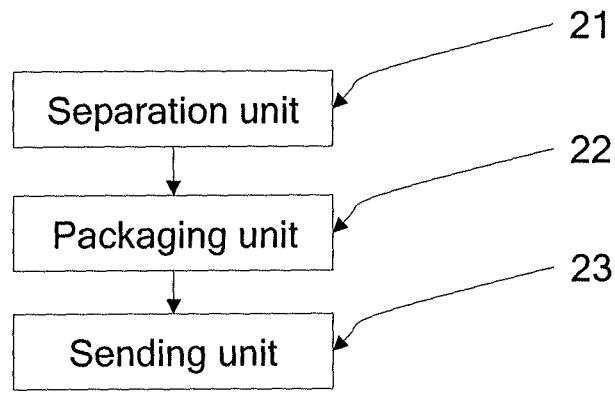
FIG. 3 is a block diagram of a communication apparatus according to Embodiment 1 of the present invention.

Correspondingly, the embodiment of the present invention further provides a communication apparatus, where a pseudo wire is established between the communication apparatus and a peer end node communicating with the communication apparatus. As shown in FIG. 3, the apparatus includes a separation unit 21, a packaging unit 22 and a sending unit 23.

The separation unit 21 is configured to separate target overhead bytes from section overhead bytes of an SDH/Sonet frame, where the target overhead bytes include DCC bytes, and this part of DCC bytes is management bytes in the SDH frame. The packaging unit 22 is configured to package the target overhead bytes that are separated by the separation unit 21 to obtain a dedicated overhead packet, where the dedicated overhead packet is transmitted separately from another packet during transmission.

Then, the sending unit 23 is configured to send the dedicated overhead packet to the peer end node through the pseudo wire, where the dedicated overhead packet is transmitted as a service packet of the pseudo wire.

The communication apparatus implements that the DCC bytes are packaged into a dedicated overhead packet and then the dedicated overhead packet is transmitted as the service packet of the pseudo wire to the peer end node through the pseudo wire.

Figure 4:
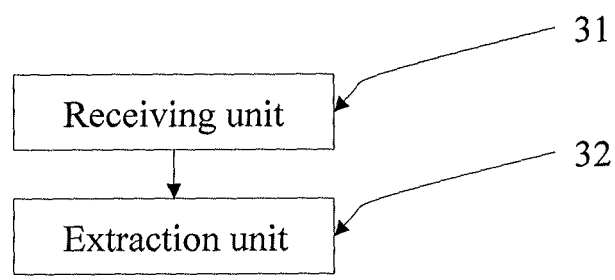
FIG. 4 is a block diagram of another communication apparatus according to Embodiment 1 of the present invention.

The embodiment of the present invention further provides a communication apparatus, where a pseudo wire is established between the communication apparatus and a peer end node of the communication apparatus. As shown in FIG. 4, the apparatus includes a receiving unit 31 and an extraction unit 32.

When the peer end node sends a dedicated overhead packet through a pseudo wire, the receiving unit 31 is configured to receive the dedicated overhead packet that is sent through the pseudo wire by the peer end node, where the dedicated overhead packet is transmitted as a service packet of the pseudo wire.

Then, the extraction unit 32 is configured to extract the target overhead bytes from the dedicated overhead packet that is received by the receiving unit 31, where the target overhead bytes include DCC bytes. In this way, the transmission of the DCC bytes is realized.

During the process of the communication between the two communication apparatuses provided by the embodiments of the present invention, one of the communication apparatuses packages the DCC bytes into a dedicated overhead byte, and then sends the dedicated overhead byte to the other communication apparatus through the pseudo wire. After receiving the dedicated overhead packet, the other communication apparatus extracts the DCC bytes from the dedicated overhead packet by unpackaging the dedicated overhead packet, thereby realizing transparent transmission of the DCC bytes. In the process of transmitting the dedicated overhead packet, since the dedicated overhead packet is transmitted as the service packet of the pseudo wire, an intermediate node in the PTN network does not need to perceive whether the packet transmitted in the pseudo wire carries a payload or a section overhead, thereby reducing a burden of the intermediate node in the PTN network and realizing real transparent transmission of the DCC bytes.

Figure 5:
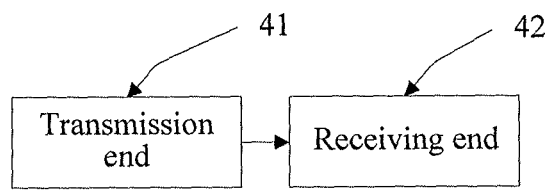
FIG. 5 is a block diagram of a system for transmitting SDH/Sonet section overhead bytes according to Embodiment 1 of the present invention.

The two communication apparatuses may further form a system for transmitting SDH/Sonet section overhead bytes, and as shown in FIG. 5, the system includes a local end node 41 and a peer end node 42.

The local end node 41 is configured to separate target overhead bytes from section overhead bytes of an SDH/Sonet frame, where the target overhead bytes include DCC bytes; package the target overhead bytes to obtain a dedicated overhead packet; and send the dedicated overhead packet to the peer end node 42 through a pseudo wire, where the dedicated overhead packet is transmitted as a service packet of the pseudo wire.

The peer end node 42 is configured to receive the dedicated overhead packet that is sent through the pseudo wire by the local end node 41, where the dedicated overhead packet is transmitted as the service packet of the pseudo wire; and extract the target overhead bytes from the dedicated overhead packet, where the target overhead bytes include the DCC bytes.

Figure 11:
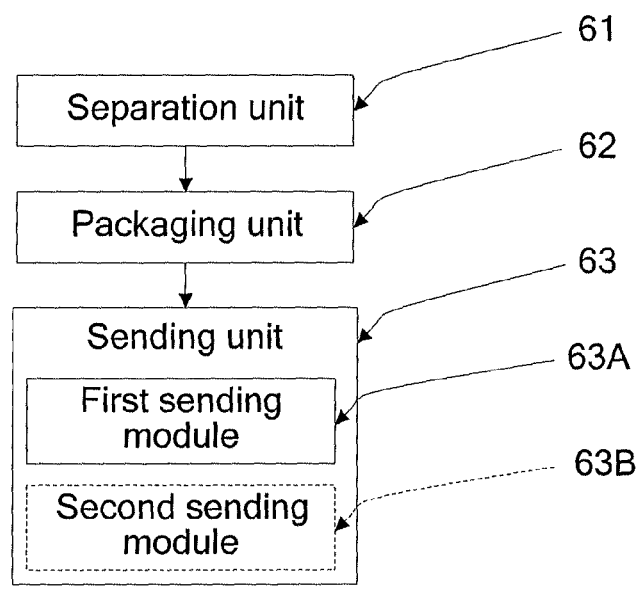
FIG. 11 is a block diagram of a communication apparatus according to Embodiment 2 of the present invention.
Figure 12:
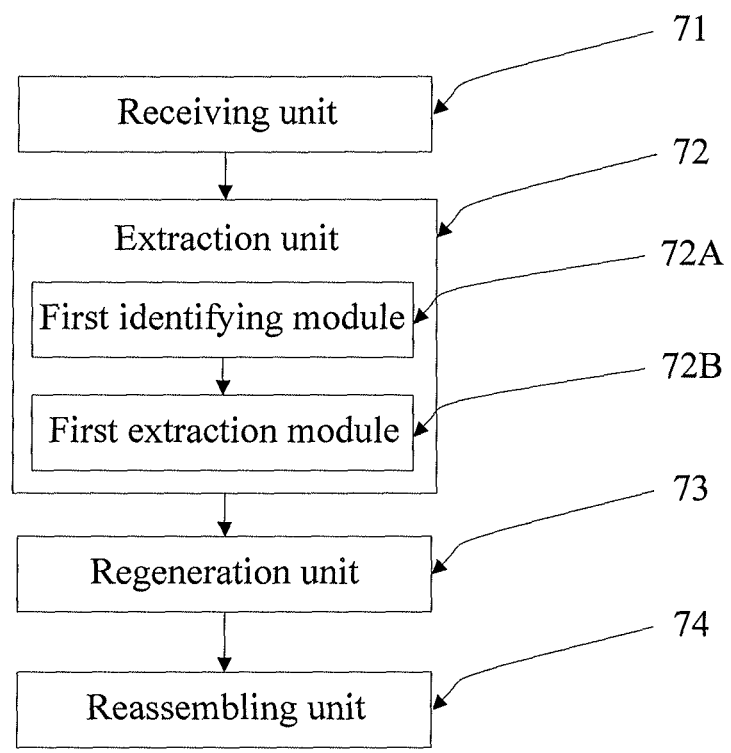
FIG. 12 is a block diagram of another communication apparatus according to Embodiment 2 of the present invention.

The local end node may specifically be the communication apparatus shown in FIG. 3 or FIG. 11, and the peer end node may be the communication apparatus shown in FIG. 4 or FIG. 12.

Embodiment 2

Figure 6:
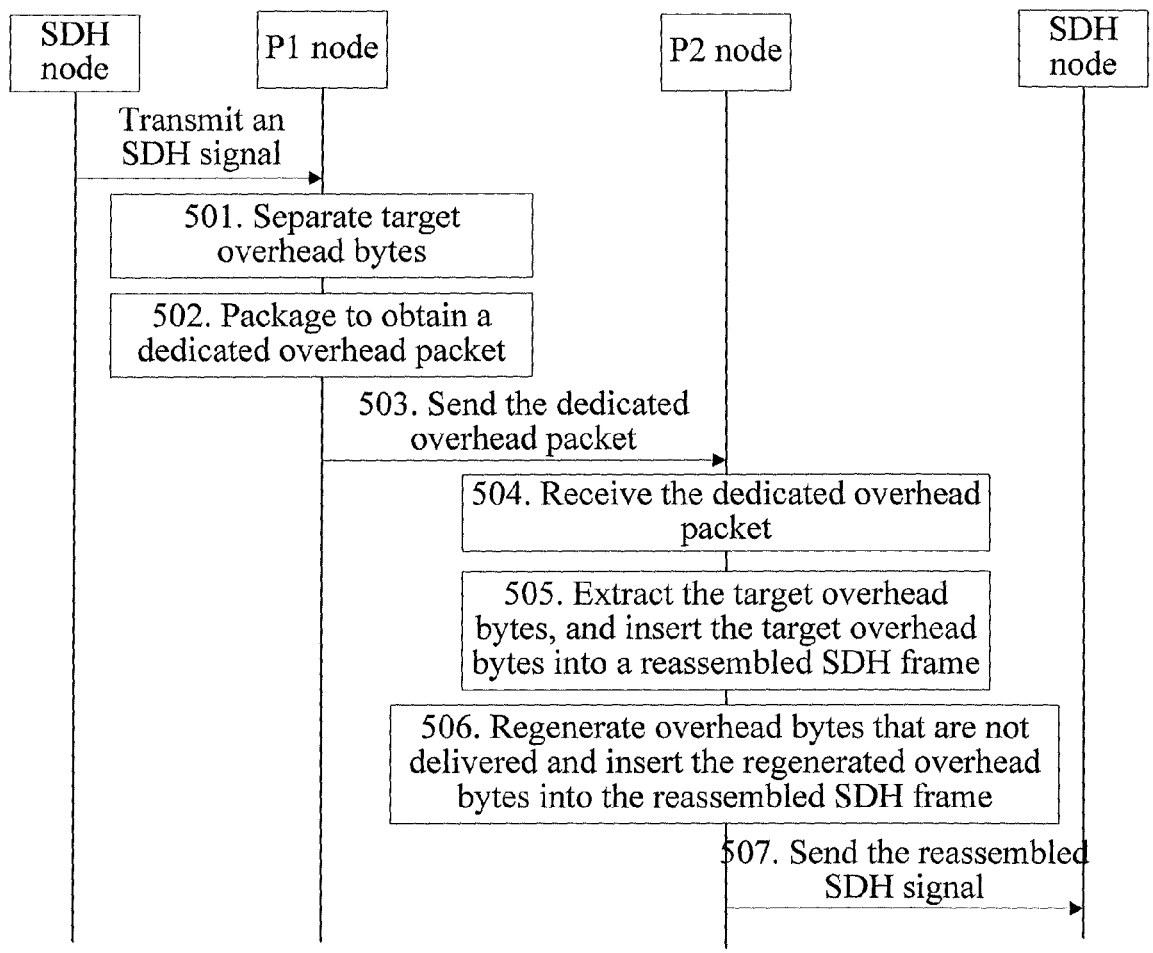
FIG. 6 is a flow chart of a method for transmitting SDH/Sonet section overhead bytes according to Embodiment 2 of the present invention.

In this embodiment of the present invention, it is assumed that an application scenario is that a PTN network is connected to different SDH networks, a method for transmitting SDH/Sonet section overhead bytes is introduced in detail in the following, and as shown in FIG. 6, the method includes the following steps:

501. Receive an SDH signal, and separate target overhead bytes.

It is assumed that a schematic diagram of the application scenario is shown in FIG. 1, where a node P0 in one of the SDH networks needs to transmit a signal to a node P3 of another SDH network. In this case, after a node P1 in the PTN network receives the SDH signal, and determines that target overhead bytes need to be transparently transmitted by analyzing a requirement on overhead transparent transmission and considering an extensibility requirement. In a specific implementation process, it may be determined the transmitting is performed on 32 bytes shown in the following Table 1.

TABLE 1

| Serial Numbers | Byte Names | Serial Numbers | Byte Names |
| --- | --- | --- | --- |
| 00 | E1 | 16 | D10 |
| 01 | F1 | 17 | D11 |
| 02 | D1 | 18 | D12 |
| 03 | D2 | 19 | Serial3 |
| 04 | D3 | 20 | E2 |
| 05 | Serial 1 | 21 | 0 byte or a CPU writable byte may be configured |
| 06 | Serial 2 | 22 | 1 byte or a CPU writable byte may be configured |
| 07 | K1 | 23 | 2 bytes or a CPU writable byte may be configured |
| 08 | K2 | 24 | 3 bytes or a CPU writable byte may be configured |
| 09 | D4 | 25 | 4 bytes or a CPU writable byte may be configured |
| 10 | Serial 4 | 26 | 5 bytes or a CPU writable byte may be configured |

TABLE 1-continued

| Serial Numbers | Byte Names | Serial Numbers | Byte Names |
|---|---|---|---|
| 11 | D5 | 27 | 6 bytes or a CPU writable byte may be configured |
| 12 | D6 | 28 | 7 bytes or a CPU writable byte may be configured |
| 13 | D7 | 29 | 8 bytes or a CPU writable byte may be configured |
| 14 | D8 | 30 | 9 bytes or a CPU writable byte may be configured |
| 15 | D9 | 31 | ID |

The bytes from 21st to 30th are configurable bytes, and if it is found that there is an omitted byte not transmitted during the transmitting, any one of the overhead bytes may be selected through software configuration.

The bytes from D1 to D12 are the DCC bytes, and these DCC bytes are management bytes in the SDH frame and should be transparently transmitted.

Positions of the bytes from Serial1 to Serial4 in all section overhead bytes of the SDH frame are shown in Table 2.

TABLE 2

| A1 | A1 | A1 | A2 | A2 | A2 | J0 | | |
|---|---|---|---|---|---|---|---|---|
| B1 | | | E1 | | | F1 | | |
| D1 | | | D2 | | | D3 | Serial 1 | Serial 2 |
| | | | AU-PTR | | | | | |
| B2 | B2 | B2 | K1 | | | K2 | | |
| D4 | Serial 4 | | D5 | | | D6 | | |
| D7 | | | D8 | | | D9 | | |
| D10 | | | D11 | | | D12 | Serial 3 | |
| S1 | | | | | M1 | E2 | | |

In Table 1, the bytes from the serial number 00 to the serial number 30 are separated from all section overhead bytes of the SDH frame, and these 31 bytes form the target overhead bytes. The byte with the serial number 31 is an ID byte. This byte indicates an ID of a local node configured through software, may transmit some special identifiers, and may be transmitted together with the target overhead bytes during actual transmission. As can be seen from a structure of the section overhead bytes of the SDH frame in Table 2, the target overhead bytes that need to be transmitted are just a part of the section overhead bytes. In this embodiment of the present invention, it is not required to transmit all the section overhead bytes, thereby saving a bandwidth.

502. Package the target overhead bytes to obtain a dedicated overhead packet.

The dedicated overhead packet is dedicated to transmitting the target overhead bytes, and during the packet transmission is transmitted separately from another packet, for example, a packet carrying a payload.

Figure 7:
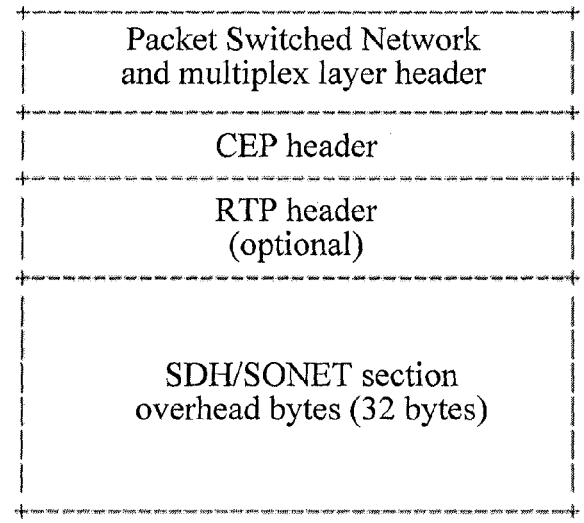
FIG. 7 is a schematic diagram of a format of a packet adopted in Embodiment 2 of the present invention.

In a specific implementation process, a packet dedicated to carrying an overhead may be defined with reference to a CEP (circuit emulation over packet) protocol, and a format of the packet is shown in FIG. 7, in which, an RTP (real-time transport protocol) header is optional. The format is similar to a format of the packet carrying the payload, but content carried by the packet is the target overhead bytes. The packet dedicated to carrying the overhead may be referred to as a dedicated overhead packet. When the target overhead bytes are packaged, the ID byte may also be carried and packaged together into the dedicated overhead packet. It can be known from the preceding analysis that, there are altogether 31 target overhead bytes and one ID byte, so an SOH field of the packet corresponds to 32 bytes.

503. After the target overhead bytes are packaged into the dedicated overhead packet, send the dedicated overhead packet to a peer end node through a pseudo wire that is established between two ends of communication, where the dedicated overhead packet is transmitted as a service packet of the pseudo wire.

In the specific implementation process, for example, in the PTN network in FIG. 1, the node P1 transmits the dedicated overhead packet to the peer end node P2 through a pseudo wire, and a manner of transmitting the dedicated overhead packet may adopt, but is not limited to, the following two manners:

Manner 1: The dedicated overhead packet may be inserted between packets carrying the payload of the SDH frame, and then the dedicated overhead packet and the packets carrying the payload of the SDH frame are sent to the peer end node through the same pseudo wire.

Figure 8:
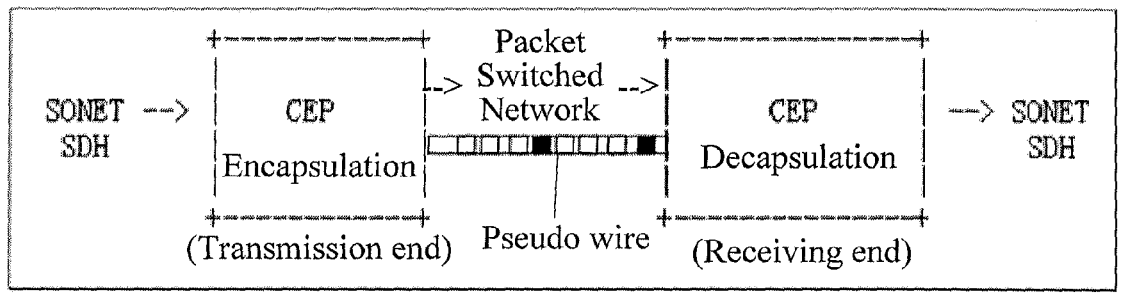
FIG. 8 is a schematic diagram of a transmitting manner according to Embodiment 2 of the present invention.

A schematic diagram of this transmission manner is shown in FIG. 8. Among the packets transmitted through the PW (pseudo wire), a black square represents the dedicated overhead packet, and a white square represents a packet carrying the payload. During transmission, the packets carrying the payload and the dedicated overhead packet are both used as service packets of the same pseudo wire, and packets that carry the payloads located between every such two dedicated overhead packets are equal in number. The number of the packets carrying the payloads is associated with the size of a payload slice. For example, when the packet carries a payload slice with 783 bytes as represented by each white square, three white packets exist between every two black packets. However, no matter how to cut the slice, white packets between every two black packets are equal in number. In this way, delay variation caused in transmitting of clock information may be reduced.

Figure 9:
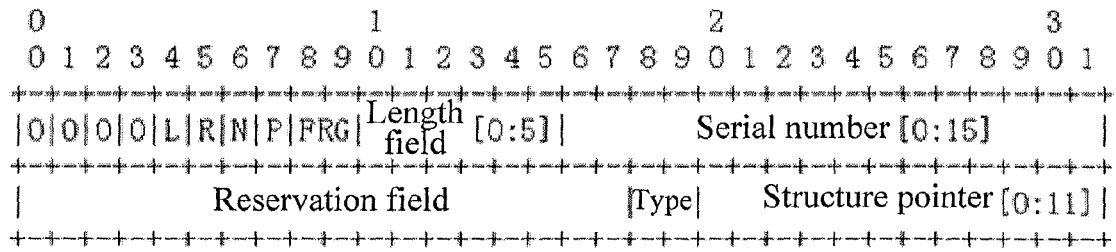
FIG. 9 is a schematic structural diagram of a packet header adopted in Embodiment 2 of the present invention.

When this manner is used to transmit a packet, a type field needs to be added in a packet header, for example, two bits may be used in the packet header to differentiate whether content carried by the packet is an overhead or a payload. As shown in FIG. 9, an L bit represents a CEP-AIS (CEP-alarm indication signal). When an AC detects a link error, the L bit is set to 1 to inform a downstream PE.

An R bit represents a CEP-RDI (CEP-remote defect indication). When out-of-synchronization occurs during packet synchronization, the R bit should be set to 1 to inform an upstream PE. After packet re-synchronization, the R bit should be reset to 0.

An N bit and a P bit are used as a relay for pointer positive/negative adjustment in a PSN network, and the bits are optionally used. When a pointer relay function is not supported, the P bit and the N bit should be set to 0.

An FRG bit represents a segment indication, which does not need to be used. This bit is set to 0 at a transmission end, and is ignored at a receiving end.

The type field is added in the format of the packet header in FIG. 9, and the type field occupies two bits, where a value of the type field may be defined as follows:

When the value is 00, it indicates that the content carried by the packet is a payload type. When the value is 01, it indicates that the content carried by the packet is an overhead type.

When the value is 1×, it indicates that the content carried by the packet is a reservation type.

In addition, a position of the type field is not limited to the position shown in FIG. 9, and may be another position in the packet header. The number of the specific bits used by the type field is not limited to the two bits either, as long as whether the content carried by the packet is the overhead or the payload can be differentiated.

In this transmission manner, the payload and the overhead pass through the same path.

Manner 2: A dedicated pseudo wire is established, and the dedicated overhead packet is used as a service packet of the dedicated pseudo wire; then, the dedicated overhead packet is sent to the peer end node through the dedicated pseudo wire.

Figure 10:
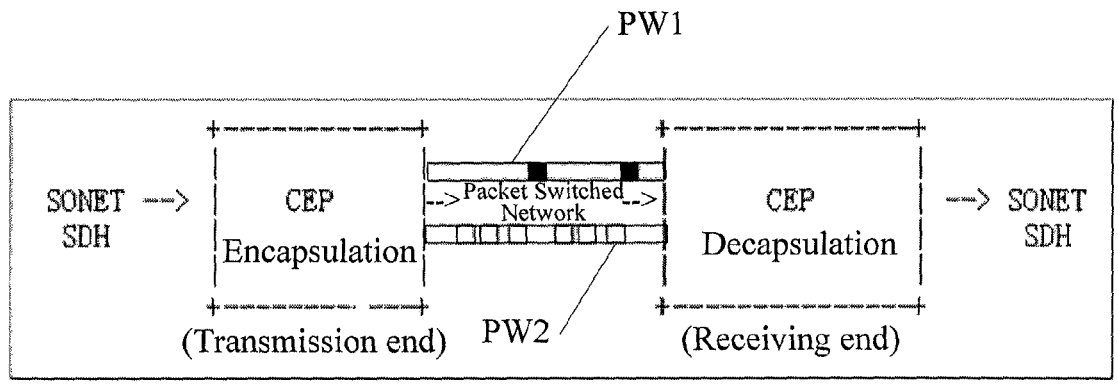
FIG. 10 is a schematic diagram of another transmitting manner according to Embodiment 2 of the present invention.

In this manner, it is not required to extend the packet header, and whether the pseudo wire is a dedicated pseudo wire may be identified through a label of the pseudo wire. As shown in FIG. 10, PW1 represents the dedicated pseudo wire for transmitting the dedicated overhead packet, and the other pseudo wire PW2 is a common pseudo wire for transmitting a packet carrying a payload. A black square on the PW1 represents a dedicated overhead packet, and a white square on the other pseudo wire PW2 represents a packet carrying the payload.

In a specific implementation process, the two pseudo wires may be bound into one LSP (label switched path) to pass through the same path. This manner is applicable to point-to-point emulation, that is, rates of two ends of emulation are the same. For example, when an STM-1 service is performed at the two ends, the two pseudo wires may be bound into one LSP.

Alternatively, each of the two pseudo wires may corresponds to an LSP, and in this way, may pass through different paths. This manner is comparatively applicable to point-to-multipoint emulation, that is, rates of two ends of emulation are different. For example, when an STM-4 service is performed at one end, and multiple different STM-1 services are performed on other ends, the DCC information is transmitted with one STM-1 services only.

504. After the dedicated overhead packet is transmitted to the peer end node, that is, the node P2 in FIG. 1, the node P2 first receives the dedicated overhead packet that is sent through the pseudo wire by the node P1, where the dedicated overhead packet is transmitted as a service packet of the pseudo wire, and the dedicated overhead packet may be extracted from the service packet of the pseudo wire.

505. Extract the target overhead bytes, and insert the target overhead bytes into a reassembled SDH frame.

After obtaining the dedicated overhead packet, the node P2 may extract the target overhead bytes from the dedicated overhead packet through unpackaging. In the specific implementation process, different processing steps may be applied according to different transmission manners. For example, when the packet is transmitted using manner 1 in step 503, the dedicated overhead packet is first identified from the service packet of the pseudo wire according to the type field in the packet header. If a packet whose type field has a value being 01 is found from all packets, it may be known from the definition of the type field that, the packet is the dedicated overhead packet. Afterwards, the target overhead bytes are extracted from the identified dedicated overhead packet. Since the target overhead bytes include DCC bytes, the DCC bytes may be obtained.

When the packet is transmitted using manner 2 in step 503, the dedicated pseudo wire is first identified according to the label of the pseudo wire. Then, the dedicated overhead packet is identified from the service packet of the dedicated pseudo wire. The target overhead bytes may be extracted from the identified dedicated overhead packet, and then the DCC bytes may be obtained.

The DCC bytes may be transparently transmitted no matter which transmission manner is adopted. After the target overhead bytes including the DCC bytes are obtained, it is required to insert each overhead byte in the target overhead bytes into the reassembled SDH frame in turn.

506 Regenerate overhead bytes that are not transmitted, and then insert the overhead bytes into the reassembled SDH frame. As can be seen from the structure of the section overhead byte of the SDH frame in table 2, in addition to the target overhead bytes to be transmitted, a part of bytes such as B1, B2 and M1 is not transmitted. This part of bytes not transmitted needs to be regenerated, and then the regenerated bytes are inserted into the reassembled SDH frame, where respective positions of the target overhead bytes and the regenerated overhead bytes in the reassembled SDH frame are the same as respective positions thereof in the SDH frame before the transmitting.

507. Send the reassembled SDH signal to another SDH network.

The node P2 in the PTN network sends the reassembled SDH frame to a receiving node P3 in another SDH network, thereby completing the transmitting of the SDH signal.

Since the overhead bytes are transmitted through the service packet of the pseudo wire, an intermediate node in the PTN network does not need to perceive whether the packet transmitted in the pseudo wire carries a payload or a section overhead, thereby reducing a burden of the intermediate node in the PTN network and realizing real transparent transmission of the DCC bytes.

The embodiment of the present invention further provides a communication apparatus, where a pseudo wire is established between the communication apparatus and a peer end node of the communication apparatus. As shown in FIG. 11, the apparatus includes a separation unit 61, a packaging unit 62 and a sending unit 63.

The separation unit 61 is configured to separate target overhead bytes from section overhead bytes of an SDH/Sonet frame, where the target overhead bytes include DCC bytes. These DCC bytes are management bytes in the SDH/Sonet frame, and should be transparently transmitted. The packaging unit 62 is configured to package the target overhead bytes to obtain a dedicated overhead packet, where the dedicated overhead packet is transmitted separately from another packet during transmission.

Then, preferably, the sending unit 63 includes a first sending module 63A. The first sending module 63A is configured to send the dedicated overhead packet and a packet that carries a payload of the SDH/Sonet frame to the peer end node through the same pseudo wire, where the packet that carries the payload and the dedicated overhead packet are both transmitted as service packets of the same pseudo wire, and packets that carry the payloads located between every such two dedicated overhead packets are equal in number.

Or optionally, the sending unit 63 includes a second sending module 63B. The second sending module 63B is configured to send the dedicated overhead packet to the peer end node through a dedicated pseudo wire, where the dedicated overhead packet is transmitted as a service packet of the pseudo wire. In addition, the second sending module 63B is further configured to send the packet carrying the payload of the SDH/Sonet frame to the peer end node through another pseudo wire.

The communication apparatus realizes that the DCC bytes are packaged into a dedicated overhead packet and the dedicated overhead packet is transmitted as the service packet of the pseudo wire to the peer end node through the pseudo wire.

The embodiment of the present invention further provides a communication apparatus, where a pseudo wire is established between the communication apparatus and a peer end node of the communication apparatus. As shown in FIG. 12, the apparatus includes a receiving unit 71, an extraction unit 72, a regeneration unit 73 and a reassembling unit 74.

The receiving unit 71 is configured to receive a dedicated overhead packet that is sent through a pseudo wire by the peer end node, where the dedicated overhead packet is transmitted as a service packet of the pseudo wire.

Afterwards, preferably, the extraction unit 72 includes a first identifying module 72A and a first extraction module 72B.

The first identifying module 72A is configured to identify the dedicated overhead packet from the service packet of the pseudo wire according to a type field of a packet header of a packet. The first extraction module 72B is configured to extract target overhead bytes from the identified dedicated overhead packet.

Or, optionally, the extraction unit 72 (not shown in the figure) includes a second identifying module 72C and a second extraction module 72D.

The second identifying module 72C is configured to identify a dedicated pseudo wire according to a label of the pseudo wire, and identify the dedicated overhead packet from a service packet of the dedicated pseudo wire. The second extraction module 72D is configured to extract the target overhead bytes from the identified dedicated overhead packet.

The transmitted target overhead bytes are obtained through the extraction unit, and there is a part of overhead bytes that is not transmitted. The regeneration unit 73 is configured to regenerate the overhead bytes that is not transmitted.

Finally, the reassembling unit 74 is configured to insert the extracted target overhead bytes and the regenerated overhead bytes into a reassembled SDH/Sonet frame, where respective positions of the target overhead bytes and the regenerated overhead bytes in the reassembled SDH/Sonet frame are the same as respective positions thereof in the SDH/Sonet frame before the transmitting.

The two communication apparatuses provided by the embodiments of the present invention are used in cooperation. A specific module adopted by the sending unit in the communication apparatus described previously corresponds to a specific module adopted by the extraction unit in the communication apparatus described later. For example, when the sending unit of one of the communication apparatuses adopts the first sending module to send the dedicated overhead packet, the extraction unit in the other communication apparatus adopts the first identifying module 72A to identify the dedicated overhead packet and adopts the first extraction module to extract the target overhead bytes from the dedicated overhead packet. Likewise, when the sending unit of one of the communication apparatuses adopts the second sending module to send the dedicated overhead packet, the extraction unit in the other communication apparatus adopts the second identifying module 72A to identify the dedicated overhead packet and adopts the second extraction module to extract the target overhead bytes from the dedicated overhead packet.

The two communication apparatuses provided by the embodiments of the present invention may be PTN-type products. In a process of using the communication apparatuses to transmit the overhead bytes, since the dedicated overhead packet carrying the overhead bytes is transmitted as a service packet of the pseudo wire, an intermediate node in the PTN network does not need to perceive whether the packet transmitted in the pseudo wire carries the payload or the section overhead, thereby reducing the burden of the intermediate node in the PTN network and implementing real transparent transmission of the DCC bytes.

The embodiments of the present invention are mainly applied to a field in which a PTN network replaces an SDH/Sonet network and may also be applied to a field in which a PTN network replaces an ATM (asynchronous transfer mode) network. Since the ATM network includes an ATM service cell and an ATM management cell, transparent transmission of the ATM service cell and the ATM management cell may be implemented by using the method, the apparatus and the system mentioned in the embodiments of the present invention.

Through the preceding descriptions of the implementation manners, it is clear to persons skilled in the art that the present invention may be accomplished through software plus necessary universal hardware, or through hardware, but the former is a preferred implementation manner in many conditions. Based on this, the preceding technical solutions or the part that makes contributions to the prior art may be substantially embodied in the form of a software product. The computer software product may be stored in a readable storage medium, such as a floppy disk, a hard disk or an optical disk of a computer and contains several instructions used to instruct a computer device (for example, a personal computer, a server, or a network device) to perform the method according to each of the embodiments of the present invention.

The preceding description is merely the specific embodiments of the present invention, but the protection scope of the present invention is not limited to this. Any modification or replacement made by persons skilled in the art without departing from the technical scope of the present invention should fall within the protection scope of the present invention. Therefore, the protection scope of the present invention is subject to the protection scope of the claims.

The invention claimed is:

1. A method for transmitting SDH/Sonet section overhead bytes, comprising:
    separating, by a local end node, target overhead bytes from section overhead bytes of an SDH/Sonet frame received by the local end node, wherein the target overhead bytes comprise data communications channel (DCC) bytes, and the target overhead bytes are a part of the section overhead bytes;
    packaging the target overhead bytes to obtain a dedicated overhead packet; and
    sending the dedicated overhead packet to a peer end node through a pseudo wire between the local end node and the peer end node as a service packet of the pseudo wire, wherein the pseudo wire is within a packet transport network (PTN).

2. The method for transmitting SDH/Sonet section overhead bytes according to claim 1, wherein the target overhead bytes further comprise: Serial1 to Serial4 bytes, E1 byte, F1 byte, E2 byte, K1 byte, K2 byte, and a configurable byte in the section overhead bytes, and the configurable byte is used for extending an overhead byte that needs to be transmitted.

3. The method for transmitting SDH/Sonet section overhead bytes according to claim 1, wherein the dedicated overhead packet is a packet defined with reference to a circuit emulation over packet (CEP) protocol.

4. The method for transmitting SDH/Sonet section overhead bytes according to claim 2, wherein the sending the dedicated overhead packet to the peer end node through the pseudo wire between the local end node and the peer end node as the service packet of the pseudo wire comprises:
    sending the dedicated overhead packet and a packet that carries a payload of the SDH/Sonet frame to the peer end node through a same pseudo wire, wherein, the packet that carries the payload and the dedicated overhead packet are both transmitted as service packets of the same pseudo wire, and packets that carry the payload located between every such two dedicated overhead packets are equal in number.

5. The method for transmitting SDH/Sonet section overhead bytes according to claim 4, wherein,
packet headers of the packet that carries the payload and the dedicated overhead packet both comprise a type field, the type field is used for identifying a type of content carried in the packet, and the type of the content comprises a payload type, an overhead type or a reservation type.

6. The method for transmitting SDH/Sonet section overhead bytes according to claim 2, wherein the sending the dedicated overhead packet to the peer end node through the pseudo wire between the local end node and the peer end node as the service packet of the dedicated pseudo wire comprises:
transmitting the dedicated overhead packet to the peer end node through a dedicated pseudo wire as a service packet of the dedicated pseudo wire.

7. The method for transmitting SDH/Sonet section overhead bytes according to claim 6, wherein the packet that carries the payload of the SDH/Sonet frame is sent to the peer end node through another pseudo wire; and
the pseudo wire for transmitting the payload and the dedicated pseudo wire are bound into a same LSP for transmission, or each of the pseudo wire for transmitting the payload and the dedicated pseudo wire separately corresponds to one LSP for transmission.

8. A method for transmitting SDH/Sonet section overhead bytes, comprising:
receiving a dedicated overhead packet that is sent through a pseudo wire by a peer end node, wherein the dedicated overhead packet is transmitted as a service packet of the pseudo wire, and wherein the pseudo wire is within a packet transport network (PTN); and
extracting target overhead bytes from the dedicated overhead packet, wherein the target overhead bytes comprise data communications channel (DCC) bytes, the target overhead bytes are separated from section overhead bytes of an SDH/Sonet frame, and the target overhead bytes are a part of the section overhead bytes.

9. The method for transmitting SDH/Sonet section overhead bytes according to claim 8, wherein the extracting the target overhead bytes from the dedicated overhead packet comprises:
identifying the dedicated overhead packet from the service packet of the pseudo wire according to a type field in a packet header; and
extracting the target overhead bytes from the identified dedicated overhead packet.

10. The method for transmitting SDH/Sonet section overhead bytes according to claim 8, wherein the extracting the target overhead bytes from the dedicated overhead packet comprises:
identifying a dedicated pseudo wire according to a label of the pseudo wire;
identifying the dedicated overhead packet from a service packet of the dedicated pseudo wire; and
extracting the target overhead bytes from the identified dedicated overhead packet.

11. The method for transmitting SDH/Sonet section overhead bytes according to claim 8, further comprising:
regenerating overhead bytes that are not transmitted; and
inserting the extracted target overhead bytes and the regenerated overhead bytes into a reassembled SDH/Sonet frame, wherein respective positions of the target overhead bytes and the regenerated overhead bytes in the reassembled SDH/Sonet frame are the same as respective positions thereof in the SDH/Sonet frame before the transmitting.

12. A communication apparatus, comprising:
a separation unit, configured to separate target overhead bytes from section overhead bytes of an SDH/Sonet frame received by the communication apparatus, wherein the target overhead bytes comprise data communications channel (DCC) bytes, and the target overhead bytes are a part of the section overhead bytes;
a packaging unit, configured to package the target overhead bytes to obtain a dedicated overhead packet; and
a sending unit, configured to send the dedicated overhead packet to a peer end node through a pseudo wire between the communication apparatus and a peer end node as a service packet of the pseudo wire, wherein the pseudo wire is within a packet transport network (PTN).

13. The communication apparatus according to claim 12, wherein the sending unit comprises a first sending module, configured to send the dedicated overhead packet and a packet that carries a payload of the SDH/Sonet frame to the peer end node through a same pseudo wire, wherein the packet that carries the payload and the dedicated overhead packet are both transmitted as service packets of the same pseudo wire, and packets that carry the payload located between every such two dedicated overhead packets are equal in number.

14. The communication apparatus according to claim 12, wherein the sending unit comprises:
a second sending module, configured to send the dedicated overhead packet to the peer end node through a dedicated pseudo wire, wherein the dedicated overhead packet is transmitted as a service packet of the dedicated pseudo wire,
wherein, the second sending module is further configured to send the packet that carries the payload of the SDH/Sonet frame to the peer end node through another pseudo wire.

15. A communication apparatus, comprising:
a receiving unit, configured to receive a dedicated overhead packet that is sent through a pseudo wire by a peer end node, wherein the dedicated overhead packet is transmitted as a service packet of the pseudo wire, and wherein the pseudo wire is within a packet transport network (PTN); and
an extraction unit, configured to extract target overhead bytes from the dedicated overhead packet, wherein the target overhead bytes comprise data communications channel (DCC) bytes, the target overhead bytes are separated from section overhead bytes of an SDH/Sonet frame, and the target overhead bytes are a part of the section overhead bytes.

16. The communication apparatus according to claim 15, wherein the extraction unit comprises:
a first identifying module, configured to identify the dedicated overhead packet from the service packet of the pseudo wire according to a type field in a packet header of the packet; and
a first extraction module, configured to extract the target overhead bytes from the identified dedicated overhead packet.

17. The communication apparatus according to claim 15, wherein the extraction unit comprises:
- a second identifying module, configured to identify a dedicated pseudo wire according to a label of the pseudo wire, and identify the dedicated overhead packet from a service packet of the dedicated pseudo wire; and
- a second extraction module, configured to extract the target overhead bytes from the identified dedicated overhead packet.

18. The communication apparatus according to claim 15, further comprising:
- a regeneration unit, configured to regenerate overhead bytes that are not transmitted; and
- a reassembling unit, configured to insert the extracted target overhead bytes and the regenerated overhead bytes into a reassembled SDH/Sonet frame, wherein respective positions of the target overhead bytes and the regenerated overhead bytes in the reassembled SDH/Sonet frame are the same as respective positions thereof in the SDH/Sonet frame before the transmitting.

19. A system for transmitting SDH/Sonet section overhead bytes, comprising:
- a local end node, configured to separate target overhead bytes from section overhead bytes of an SDH/Sonet frame received by the local end node, wherein the target overhead bytes comprise data communications channel (DCC) bytes, and the target overhead bytes are a part of the section overhead bytes; package the target overhead bytes to obtain a dedicated overhead packet; and send the dedicated overhead packet to a peer end node through a pseudo wire as a service packet of the pseudo wire, wherein the pseudo wire is within a packet transport network (PTN); and
- the peer end node, configured to receive the dedicated overhead packet that is sent through the pseudo wire, wherein the dedicated overhead packet is transmitted as the service packet of the pseudo wire; and extract the target overhead bytes from the dedicated overhead packet, wherein the target overhead bytes comprise the DCC bytes.

\* \* \* \* \*